Patented May 7, 1940

2,200,006

UNITED STATES PATENT OFFICE 2,200,006

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application April 15, 1939,
Serial No. 268,124

11 Claims. (Cl. 260—205)

This invention relates to the art of dyeing or coloring. More particularly, it relates to new azo dye compounds and the application of the nuclear non-sulfonated compounds for the coloration of organic derivatives of cellulose, particularly textile materials made of or containing an organic derivative of cellulose, by dyeing, printing, stenciling, or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of our invention to provide a new class of azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The azo dye compounds of our invention have the general formula:

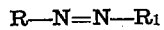

wherein R represents an aryl nucleus of the benzene series containing but one benzene nucleus, said aryl nucleus being substituted with at least one nitro group and at least one —S—$R_2$ group, wherein $R_2$ represents a member selected from the group consisting of hydrogen, an alkyl group and a hydroxyalkyl group and $R_1$ represents a member selected from the group consisting of a hydroaromatic nucleus, a heterocyclic nucleus, a N-alkylarylamine of the benzene series and a N-alkylarylamine of the naphthalene series and wherein said N-alkylarylamines contain but one benzene and but one naphthalene nucleus, respectively.

It will be understood that alkyl as used in the expression N-alkylarylamine, appearing herein and in the claims, includes not only unsubstituted alkyl groups such as a methyl group, an ethyl group, a propyl group or a butyl group, but also substituted alkyl groups such as β-hydroxyethyl, β,γ-hydroxypropyl, β-methoxyethyl, β-ethoxyethyl or β'-methoxy-β-ethoxyethyl, for example. Thus the amino group of the N-alkylarylamine of the benzene or naphthalene series may have one or both of its hydrogen atoms replaced with an alkyl group, wherein alkyl has the meaning just assigned to it. Where both hydrogen atoms of the amino group are replaced the same or two different alkyl groups may be present.

The aryl nucleus designated R may contain other substituents in addition to a nitro group or a —S—$R_2$ group. Representative groups that may be present include, for example, an alkyl group such as methyl, ethyl, propyl, butyl, β-hydroxyethyl or β-methoxyethyl, an alkoxy group such as methoxy, ethoxy, propoxy or β-methoxyethoxy, a halogen atom such as bromine, chlorine or iodine and a hydroxy group.

The azo dye compounds of our invention can be prepared by diazotizing an amine having the general formula $RNH_2$, wherein R has the meaning previously assigned to it, and coupling the diazonium compound obtained with a hydroaromatic coupling component, a heterocyclic coupling component, or a N-alkylarylamine of the benzene or naphthalene series capable of coupling.

As previously indicated, the nuclear non-sulfonated azo dye compounds of our invention constitute valuable dyes for the coloration of organic derivatives of cellulose, such as those hereinbefore mentioned, yielding various shades thereon of good fastness to light and washing. Compounds containing a nuclear sulfonic acid grouping in either of the nuclei R and $R_1$ possess little or no utility for the coloration of organic derivatives of cellulose but can be employed to color textile materials such as wool and silk, yielding generally similar shades as the corresponding non-sulfonated compounds yield on organic derivatives of cellulose. These compounds can be prepared by sulfonation of the non-sulfonated compounds in accordance with known methods or by the use of previously sulfonated components. For the dyeing of organic derivatives of cellulose, such as cellulose acetate silk, nuclear non-sulfonated compounds wherein $R_1$ is a N-alkylarylamine of the benzene series are generally advantageous.

The following examples illustrate the preparation of the azo dye compounds of our invention:

*Example 1*

0.1 gram mole of the sulfuric acid salt of 2-amino-4-nitrophenylthiomethylether is placed in 150 cc. of water to which has been added 15 cc. (0.15 gram mole) of 36% hydrochloric acid. The resulting solution is cooled to a temperature approximating 0–5° C. by the addition of ice, for example, and the amine is diazotized by the addition of a concentrated aqueous solution of 6.9 grams of sodium nitrite.

0.1 gram mole of 5,5-dimethyl-1,3-cyclohexadione are dissolved in a solution of 31.8 grams of sodium carbonate in 150 cc. of water. The resulting solution is cooled to a temperature approximating 0–10° C. and the diazo solution prepared above is added with stirring. Upon completion of the coupling reaction which takes place the mixture is made acid to litmus by the addition of acetic acid or a dilute mineral acid. The precipitated dye compound is recovered by filtration, washed with water and dried. The dye compound obtained colors cellulose acetate silk a yellow shade of good fastness to light and washing.

By the substitution of 0.1 gram mole of an amine corresponding to that employed in the example but in which the 1-position is substituted with a —$SC_2H_5$, a —$SC_3H_7$, —$SC_2H_4OH$, —$SCH_2CHOHCH_2OH$ or a —$SCH_2CHOHCH_3$ group, dye compounds generally similar to that of the example may be prepared.

Similarly, by the substitution of 0.1 gram mole of 5-methyl-1,3-cyclohexadione, 4-methyl-1,3-cyclohexadione, 6-cyano-5-phenyl-1,3-cyclohexadione, 5-phenyl-1,3-cyclohexadione, 5-ethyl-1,3-cyclohexadione or 5,5-diethyl-1,3-cyclohexadione, for example, for the 5,5-dimethyl-1,3-cyclohexadione of the example, further dye compounds included within the scope of our invention can be obtained. Each of these 1,3-cyclohexadione coupling components can be coupled with the diazo forms of the 2-amino-4-nitrophenylthioalkylethers, referred to above, to obtain dye compounds of our invention.

*Example 2*

0.1 gram mole of 2-amino-4-nitrophenylthioethylether is diazotized in accordance with the method described in Example 1 and the diazonium compound obtained is coupled with 0.1 gram mole of barbituric acid dissolved in 200 cc. of water containing 31.8 grams of sodium carbonate. Coupling is carried out in a cold solution and with stirring of the reaction mixture. Upon completion of the coupling reaction, the mixture is made acid to litmus by the addition of acetic acid. The dye compound formed is recovered by filtration, washed with water and dried. The dye compound obtained in accordance with this example colors cellulose acetate silk a yellow shade of good fastness to light and washing.

By the substitution of 0.1 gram mole of 2-amino-4-nitrophenylthioalkylethers in which the thioalkylether group is —$SCH_3$, —$SC_3H_7$, —$SC_2H_4OH$,
—$SCH_2CHOHCH_2OH$ and —$SCH_2CHOHCH_3$, for example, for the 2-amino-4-nitrophenylthioethylether of the example, generally similar dye compounds to that obtained in the example may be prepared. These dye compounds yield various shades of yellow on cellulose acetate silk.

Other barbituric acid coupling components such as 5-phenylbarbituric acid, 2-amino-3-cyanobarbituric acid, 6-methyliminobarbituric acid, 6-ethyliminobarbituric acid, 2-ethyliminobarbituric acid, 2-β-hydroxyethyliminobarbituric acid, 5-benzylbarbituric acid, 5-ethylbarbituric acid, thiobarbituric acid, 6-iminothiobarbituric acid, 6-methyliminothiobarbituric acid, 4,6-diiminothiobarbituric acid, 5-ethylthiobarbituric acid, 5-ethylthiobarbituric acid and 5-phenylthiobarbituric acid, for example, may be coupled with the diazo compounds of the 2-amino-4-nitrophenylthioalkylethers disclosed above. The coupling reaction may be carried out as described in this or the preceding example.

*Example 3*

0.1 gram mole of 2-amino-3,5-dinitrophenylthiomethylether is diazotized and the diazonium compound is coupled with 0.1 gram mole of di-β-hydroxyethylaniline. The dye compound obtained colors cellulose acetate silk a violet shade of good fastness to light and washing.

0.1 gram mole of 2-amino-3-nitro-5-methylphenylthiomethylether, 2-amino-3-nitro-5-chlorophenylthiomethylether and 2-amino-3-nitro-5-methoxyphenylthiomethylether, for example, can be substituted for the 2-amino-3,5-dinitrophenylthiomethylether of the example to obtain compounds included within the scope of our invention.

*Example 4*

0.1 gram mole of

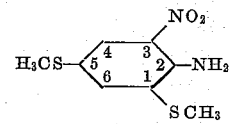

is diazotized and the diazonium compound obtained is coupled with 0.1 gram mole of di-β-hydroxyethyl-m-toluidine. The dye compound obtained in accordance with this example colors cellulose acetate a red shade of good fastness to light and washing. By the substitution of an equivalent amount of other alkylarylamines, such as di-β-hydroxyethylaniline, β-hydroxyethylaniline, di-β-hydroxyethyl-m-chloroaniline, methylaniline, methyl-β-hydroxyethylaniline, methylpropylaniline, di-β-hydroxy-m-methoxyaniline and β-methoxyethylaniline, for example, for the di-β-hydroxyethyl-m-toluidine, generally similar dyes included within the scope of our invention can be prepared. These dye compounds yield various shades of good light fastness when applied to the coloration of organic derivatives of cellulose such as cellulose acetate.

*Example 5*

0.1 gram mole of the sulfuric acid salt of 1-amino-2-thiomethyl-4-nitrobenzene is placed in 150 cc. of water to which has been added 15 cc. (0.1 gram mole) of 36% hydrochloric acid. The resulting solution is cooled to a temperature approximating 0–5° C. and the amine is diazotized at this temperature by the addition with stirring of a concentrated aqueous solution of 6.9 grams of sodium nitrite. 0.1 gram mole of di-β-hydroxyethyl-α-naphthylamine are dissolved in 100 cc. of glacial acetic acid. The resulting solution is cooled to a temperature approximating 0–10° C. and the diazo solution prepared above is added with stirring. After standing for about fifteen minutes, the mixture is made neutral to Congo red paper by the addition of sodium acetate and when coupling is complete the dye compound formed is precipitated by the addition of water, recovered by filtration, washed with water and dried. The dye compound obtained colors cellulose acetate silk a rubine shade.

By the substitution of 0.1 gram mole of glyceryl-α-naphthylamine, ethylglyceryl-α-naphthylamine, β-hydroxyethyl-α-naphthylamine, methyl-β-hydroxyethyl-α-naphthylamine, butyl-β-hydroxyethyl-α-naphthylamine, methylethyl-α-naphthylamine and 1-β-hydroxyethylamino-5-naphthol, for example, for the di-β-hydroxy-α-naphthylamine of the example, further dye compounds included within the scope of our invention can be prepared.

*Example 6*

0.1 gram mole of

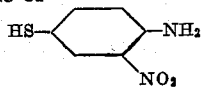

is diazotized and coupled with 0.1 gram mole of glycerylaniline. The dye compound obtained colors cellulose acetate silk a red shade.

By the substitution of 0.1 gram mole of aryl-α-naphthylamine, ethyl-β-hydroxyethyl-α-naphthylamine, ethylglycerylaniline, ethylbenzylaniline and m-methyl-β-hydroxyethylaniline, for example, for the glycerylaniline of the example, other dye compounds included within the scope of our invention can be prepared.

The following tabulation further illustrates the compounds of our invention together with the color they produce on cellulose acetate silk. The compounds indicated below may be prepared by diazotizing the amines listed under the heading "Amine" and coupling the diazonium compounds formed with the compounds specified in the column entitled "Coupling component." The diazotization and coupling reactions may, for example, be carried out following the general procedure described in Examples 1 to 6 inclusive.

| Amine | Coupling component | Color on cellulose acetate silk |
|---|---|---|
| [NO₂, NH₂, SCH₃ benzene] | 1-phenyl-3-methyl-5-pyrazolone | Golden-yellow. |
| Do | 1-phenyl-3-hydroxy-5-pyrazole | Orange-yellow. |
| Do | Dimethylaniline | Orange. |
| Do | Ethyl methylaniline | Do. |
| Do | m-Methyl-di-β-hydroxyethylaniline | Do. |
| [NO₂, NH₂, SCH₃ benzene] | 5,5-dimethyl-1,3-cyclohexadione | Yellow. |
| Do | Barbituric acid | Do. |
| Do | Di-β-hydroxyethylaniline | Red. |
| Do | Ethyl-β-hydroxyethylaniline | Do. |
| Do | Di-β-hydroxyethyl-α-naphthylamine | Rubine. |
| Do | m-Methoxy-di-β-hydroxyethylaniline | Red. |
| [H₂N, SC₂H₅, NO₂ benzene] | Di-β-hydroxyethylaniline | Do. |
| [NO₂, NH₂, SCH₃ benzene] | m-Methyl-β-hydroxyethylaniline | Orange-red. |
| [NO₂, NH₂, SH benzene] | Di-β-hydroxyethylaniline | Orange. |
| [HS, NH₂, NO₂ benzene] | 1-phenyl-3,5-diketopyrazolidine | Orange-yellow. |
| Do | Ethyl-β-hydroxyethylaniline | Orange. |
| [NO₂, NH₂, SH benzene] | Ethyl propylaniline | Do. |
| [NO₂, Cl, NH₂, SCH₃ benzene] | Di-β-hydroxyethyl cresidine | Violet. |

| Amine | Coupling component | Color on cellulose acetate silk |
|---|---|---|
| NO₂-C₆H₃(OH)(SCH₃)-NH₂ | Glyceryl-α-naphthylamine | Violet. |
| NO₂-C₆H₃(COOC₂H₅)(SC₂H₅)-NH₂ | Di-β-hydroxyethylaniline | Rubine. |
| H₅C₂S-C₆H₃(NO₂)(SCH₃)-NH₂ | m-Chlor-β-hydroxyethylaniline | Orange. |
| NO₂-C₆H₃(SH)-NH₂ | C₆H₄(CH₃)-N(C₂H₄OH)₂ | Pink-rubine. |
| Do | C₆H₄-N(CH₂CHOHCH₂OH)(CH₂-C(H₂)-COH) | Pink. |
| Do | 2,4-dihydroxypyridine | Yellow. |
| Do | Quinoline | Do. |
| Do | 1,3-diketohydrindine | Do. |
| NO₂-C₆H₃(SCH₃)(NO₂)-NH₂ | Glyceryl-α-naphthylamine | Red-blue. |
| Do | C₆H₂(OCH₃)(NHCOCH₃)-N(C₂H₅)(CH₂CHOHCH₂OH) | Blue. |

It will be understood that the compounds described in the examples and in the tabulation are intended to be illustrative and not limitative of our invention. Any of the amines disclosed herein, for example, can be diazotized and the diazonium compounds obtained coupled with any of the coupling components disclosed herein.

The azo dyes of our invention which have the general formula: R₃—N=N—R₁ wherein R₃ represents an aryl nucleus of the benzene series containing but one benzene nucleus, said aryl nucleus being substituted with at least one nitro group and containing a —SH group in ortho position to the azo bond and R₁ has the meaning previously assigned to it can be oxidized to obtain dye compounds having the general formula:

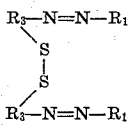

wherein R₁ and R₃ have the meaning previously assigned to them and wherein the —S—S— linkage is attached to both the R₃ nuclei in ortho position to the azo bond. These compounds yield dyeings which are very fast to light and washing. The oxidation may be effected after application of the dye to the material undergoing coloration. That is, the unoxidized dye can be applied to the material and oxidized thereon. Alternately the unoxidized dye can be separately oxidized and the oxidized dye itself applied to the material to be colored. Oxidation can be effected with an oxidizing agent such as iodine, hydrogen peroxide and sodium peroxide, for example.

The following example illustrates how oxidation can be effected when the dye has been applied to the material.

*Example A*

A cellulose acetate silk fabric dyed with the dye having the formula:

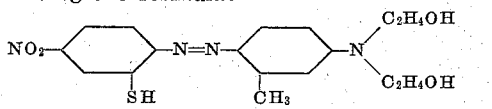

is entered into a bath containing sodium carbonate or sodium hydroxide and well worked. When the fabric is completely wetted out, iodine is added to oxidize the dye to the disulfide represented by the formula:

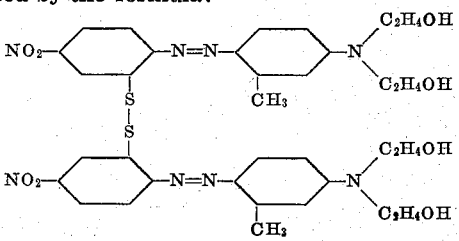

Care should be taken that the alkalinity of the bath is not sufficiently high to damage the fabric. By the process described the dyed fabric is rendered very stable to light and fast to washing.

The azo dye compounds of our invention are, for the most part, relatively insoluble in water. They may be advantageously employed for the direct dyeing of textile materials made of or containing an organic derivative of cellulose by grinding the dye to a fine powder, intimately mixing it with a suitable dispersing or solubilizing agent and adding the resulting mixture to water or to a dilute solution of soap in water to form an aqueous dyebath. Following this known preparation of the dyebath, the textile material or materials to be dyed may be added to the dye bath and the dyeing operation conducted in known fashion. For a more complete description as to how the azo dye compounds of our invention can be employed in dyeing or coloring operations, reference may be had to our U. S. Letters Patent No. 2,115,030, issued April 26, 1938.

We claim:

1. The azo dye compounds having the general formula:

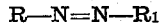
R—N=N—R₁ wherein R represents an aryl nucleus of the benzene series containing but one benzene nucleus, said aryl nucleus being substituted with at least one nitro group and at least one —S—R₂ group, wherein R₂ represents a member selected from the group consisting of hydrogen, an alkyl group and a hydroxyalkyl group and R₁ represents a member selected from the group consisting of a hydroaromatic nucleus, a heterocyclic nucleus, a N-alkylarylamine of the benzene series and a N-alkylarylamine of the naphthalene series and wherein said N-alkylarylamines contain but one benzene and but one naphthalene nucleus, respectively.

2. The azo dye compounds having the general formula:

R—N=N—R₁ wherein R represents an aryl nucleus of the benzene series containing but one benzene nucleus, said aryl nucleus being substituted with at least one nitro group and at least one —S—R₂ group, wherein R₂ represents a member selected from the group consisting of hydrogen, an alkyl group and a hydroxyalkyl group and R₁ represents a N-alkylarylamine of the benzene series containing but one benzene nucleus.

3. The azo dye compounds having the general formula:

R—N=N—R₁ wherein R represents an aryl nucleus of the benzene series containing but one benzene nucleus, said aryl nucleus being substituted with at least one nitro group and at least one —S—R₂ group, wherein R₂ represents a member selected from the group consisting of hydrogen, an alkyl group and a hydroxyalkyl group and R₁ represents a N-alkylarylamine of the benzene series containing but one benzene nucleus and in which the alkylamino group is in p-position to the azo bond.

4. The azo dye compounds having the general formula:

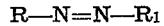
R—N=N—R₁ wherein R represents an aryl nucleus of the benzene series containing but one benzene nucleus, said aryl nucleus being substituted with at least one nitro group and at least one —S—R₂ group, wherein R₂ represents an alkyl group and R₁ represents a N-alkylarylamine of the benzene series containing but one benzene nucleus and in which the alkylamino group is in p-position to the azo bond.

5. The azo dye compounds having the general formula:

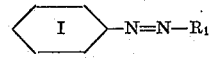

wherein the phenyl nucleus designated I contains at least one nitro group and at least one —S—R₂ group, wherein R₂ represents a member selected from the group consisting of hydrogen, an alkyl group and a hydroxyalkyl group and R₁ represents a N-alkylarylamine of the benzene series containing but one benzene nucleus.

6. The azo dye compounds having the general formula:

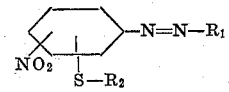

wherein R₂ represents a member selected from the group consisting of hydrogen, an alkyl group, and a hydroxyalkyl group and R₁ represents a N-alkylarylamine of the benzene series containing but one benzene nucleus and in which the alkylamino group is in p-position to the azo bond.

7. Material made of or containing an organic derivative of cellulose colored with a nuclear non-sulfonated azo dye compound having the general formula:

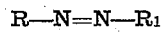
R—N=N—R₁ wherein R represents an aryl nucleus of the benzene series containing but one benzene nucleus, said aryl nucleus being substituted with at least one nitro group and at least one —S—R₂ group, wherein R₂ represents a member selected from the group consisting of hydrogen, an alkyl group and a hydroxyalkyl group and R₁ represents a member selected from the group consisting of a hydroaromatic nucleus, a heterocyclic nucleus, a N-alkylarylamine of the benzene series and a N-alkylarylamine of the naphthalene series and wherein said N-alkylarylamines contain but one benzene and but one naphthalene nucleus, respectively.

8. Material made of or containing an organic derivative of cellulose colored with a nuclear non-sulfonated azo dye compound having the general formula:

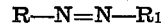
R—N=N—R₁ wherein R represents an aryl nucleus of the benzene series containing but one benzene nucleus, said aryl nucleus being substituted with at least one nitro group and at least one —S—R₂ group, wherein R₂ represents a member selected from the group consisting of hydrogen, an alkyl group and a hydroxyalkyl group and R₁ represents a N-alkylarylamine of the benzene series containing but one benzene nucleus and in which the alkylamino group is in p-position to the azo bond.

9. A cellulose acetate colored with a nuclear non-sulfonated azo dye compound having the general formula:

R—N=N—R₁ wherein R represents an aryl nucleus of the benzene series containing but one benzene nucleus, said aryl nucleus being substituted with at least one nitro group and at least one —S—R₂ group, wherein R₂ represents a member selected from the group consisting of hydrogen, an alkyl group and a hydroxyalkyl group and $R_1$ represents a N-alkylarylamine of the benzene series containing but one benzene nucleus and in which the alkylamino group is in p-position to the azo bond.

10. A cellulose acetate colored with a nuclear non-sulfonated azo dye compound having the general formula:

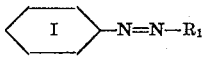

wherein the phenyl nucleus designated I contains at least one nitro group and at least one —S—$R_2$ group, wherein $R_2$ represents a member selected from the group consisting of hydrogen, an alkyl group and a hydroxyalkyl group and $R_1$ represents a N-alkylarylamine of the benzene series containing but one benzene nucleus.

11. A cellulose acetate colored with a nuclear non-sulfonated azo dye compound having the general formula:

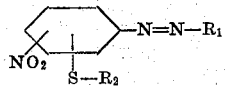

wherein $R_2$ represents a member selected from the group consisting of hydrogen, an alkyl group, and a hydroxyalkyl group and $R_1$ represents a N-alkylarylamine of the benzene series containing but one benzene nucleus and in which the alkylamino group is in p-position to the azo bond.

JAMES G. McNALLY.
JOSEPH B. DICKEY.